Dec. 29, 1959          D. LABINO          2,919,211
EVAPORATOR PLATE AND METHOD OF PRODUCING THE SAME
Filed Dec. 30, 1954
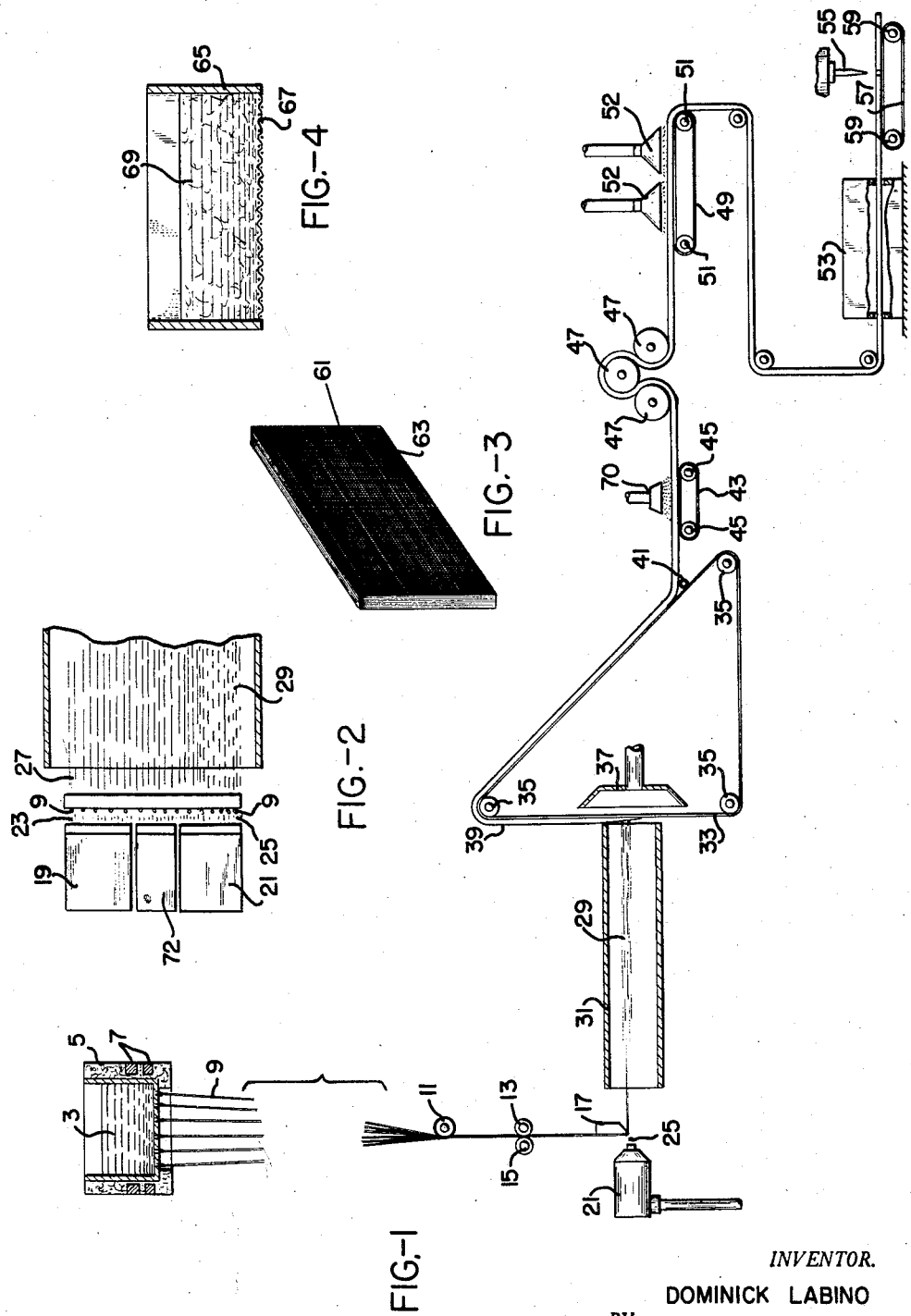
INVENTOR.
DOMINICK LABINO
BY Toulmin & Toulmin
ATTORNEYS

United States Patent Office 2,919,211
Patented Dec. 29, 1959

2,919,211

EVAPORATOR PLATE AND METHOD OF PRODUCING THE SAME

Dominick Labino, Toledo, Ohio, assignor, by mesne assignments, to L-O-F Glass Fibers Company, Toledo, Ohio, a corporation of Ohio Application December 30, 1954, Serial No. 478,755

10 Claims. (Cl. 117—126)

This invention relates to evaporator plates.

Primary requirements for commercially useful evaporator plates are that: they must have a high capillarity; they must be sufficiently rigid to withstand the service but must not be brittle or fragile; they must have a high degree of handleability; and they must be unaffected by water and particularly must be non-separating in water. In addition the plates must be economical to produce.

An important criterion of the quality and utility of an evaporator plate is the rate at which a plate having a lower edge in water permits the rise of water to the upper edge of the plate—that is the capillary potential. This potential must neither be too great nor too small—a standard test is that the rise up a distance of about 4 inches of the plate should require between one to two minutes and such criterion will be referred to hereinafter in connection with the plates of this invention.

It has hitherto not been possible to attain in an economical way the required degree of plate rigidity without brittleness and fragility, and a primary object of this invention is the provision of an economical method to attain a new and improved evaporator plate.

A particular object of the invention is the provision of a novel evaporator plate having all of the required characteristics set out hereinbefore and which plate fully meets the requirements of the above stated test.

I have found that an unusually efficient evaporator plate may be produced from glass fibers and a non-film forming bonding agent; the glass fibers are very small in diameter, of short length, and fibers of two different sizes and length are utilized to attain the necessary porosity and capillary characteristics in the product. The fibers employed are absorbent to water, the smaller fibers being more readily wettable.

The non-film forming bonding agent holds the fibers together, does not inhibit the capillary action of the fibers and makes the product sufficiently rigid for the purpose while leaving a degree of flexibility in the product. As the non-film forming binder I prefer colloidal silica although other non-film formers such as colloidal alumina are useful.

In the preferred practice of the invention glass fibers, which are attained by drawing glass filaments from a molten body of glass and then attenuating the filaments in a hot gaseous blast, are employed; the attenuation in the blast results in fibers of small diameter and short length. The major proportion of fibers, preferably about 85 percent of the product weight, are suitably of a length of about ½ inch to 1 inch and have a diameter of 2 to 3 microns; the minor proportion, about 10 percent of the preferred product weight has a length of about 1/16 inch at the most and a micro diameter—i.e. below one micron and preferably ¼ to ½ microns. A product having such fibers and about 5 percent by weight of silica as a bonding agent has all the required characteristics indicated hereinbefore, the higher capillary potential of the smaller fibers being effective to increase the capillary potential of the product to bring the same within the required degree of capillarity.

It is important that the fibers of both sizes be adsorbent and somewhat absorbent. By the former term is meant the phenomenon which consists in the adhesion in an extremely thin layer of the molecules of water, for example, to the fiber surface; by the latter term is meant the ability of the fiber to take up and retain water, for example. The blown fibers described hereinbefore have these characteristics. For the large size fibers diameters of 2–5 microns are useful; for the smaller size fibers the diameters should be less than one micron.

The larger diameter fibers are always in the major proportion, that is at least about 75–80 percent of the product by weight. The smaller size fibers may constitute 5–15 percent of the product by weight, while the non-film forming binding agent constitutes 5–10 percent of the product by weight. The smaller fibers being more adsorptive to liquids, particularly water, provide when in greater proportion a higher degree of capillary potential in the product, but also the small fibers as the proportion thereof increases, apparently tend to decrease porosity in the product undesirably and accordingly the extent of smaller diameter fibers should be limited in accordance with their own size and the particular size of the larger diameter fibers.

The product described above may be produced on a small scale by separately blowing the two sizes of fibers, adding them with water to a beater in the proportions indicated, with a quantity of colloidal silica and blending; thereafter the water is drained off, most suitably through screening, and the evaporator plate formed in the draining is dried to the completed product. The preferred production method for economically effecting evaporator plate production will be described in detail hereinafter.

The major proportion of fibers, that is the larger size, may suitably constitute 80 to 90 percent of the weight of the product; the minor proportion of the fibers may suitably constitute 5 to 15 percent of the weight of the fibers and the silica may effectively comprise 5 to 10 percent of the total weight. Further while the fibers may vary slightly from the specific dimensions it is essential that the minor proportion of fibers be of short length and not greater than 1 micron in diameter in order that the required porosity and capillarity will be developed in the larger diameter fibers. The term micro as used hereinafter will be understood to mean those fibers having a diameter of one micron or less and which constitute the minor fiber proportion of the product.

The invention will be more fully understood by reference to the following detailed description and accompanying drawings wherein:

Figure 1 is a schematic elevational view of production apparatus useful in the formation of the evaporator plate of this invention;

Figure 2 is a plan view of the left hand portion of Figure 1;

Figure 3 is a perspective view of the evaporator plate of this invention; and

Figure 4 illustrates a batch method of forming the evaporator plate of this invention.

Referring to the drawings, there is shown at 1 in Figure 1 a platinum pot for the retention of molten glass 3 and the pot is surrounded by insulation material 5 and induction coils 7 supplied from a source of energy (not shown) for maintaining the glass 3 in a molten condition.

Filaments 9 are drawn from the molten body 3 over a guide 11 by co-acting drawing rolls 13, 15; roll 13 is driven and the filaments are sufficiently solidified when they enter the drawing rolls to permit of the necessary attenuation of the filaments. Positioned below the drawing rolls is a guide block 17 over which filaments 9 pass in parallel relation, as more clearly seen in Figure 2.

Burners 19, 21 are provided to project gas blasts 23, 25 to the filaments while a burner 72, smaller in width, projects a third gaseous blast. As shown burners 19 and 21 are wider than burner 72, but burners 19 and 21 may suitably be replaced by a plurality of burners of lesser width if desired. The blasts, 23, 25 emanating from the burners 19, 21, as shown most clearly in Figure 2, are relatively wide and a majority of the filaments are subjected to the effect of this gas and the filaments are softened and attenuated thereby and blown into fibers, 27, 29 having a diameter in the range of 2 to 3 microns and a length of about ½ to 1 inch. The temperature of the gas blasts of the burners 19, 21 may, for example, be about 3000° F. and the blast velocities may be about 1600 feet per second.

The temperature of the blast emanating from the burner 72 is greater, preferably about 3300° F. at a velocity of about 1800 feet per second, and the filaments struck by this blast accordingly are more highly attenuated; these fibers may have a diameter in the range of about ¼ to ½ micron and a length of not greater than about ¹⁄₁₆ of an inch.

Positioning the burner 72, which blows the finer fibers, between the burners 19, 21 insures of a thorough mixing of the finer fibers with the larger fibers 27, 29 in the turbulent gas blasts.

It is to be noted that while the description has been of combining the blown fibers of larger and smaller sizes in an air stream, that the fibers may be separately blown and blended in a mixer as more particularly noted hereinafter.

The blown fibers, referring again to Figure 1, enter the conduit 31 and a screen belt 33 mounted on rollers 35, one of which is driven by means (not shown) passes upwardly across the mouth of the conduit 31 and the fibers, well mixed together in the gaseous blast in the conduit, are received on the belt; a vacuum conduit is indicated at 37 to assist the deposition of the fibers.

The fibers in the air stream are, as noted, intermingled and the mat 39 formed on the screen 33 has the smaller diameter fibers dispersed substantially uniformly throughout the larger diameter fibers.

On the take-off side of the belt 33 a roller 41 is provided to facilitate the removal of the mat 39, which then passes over a belt 43 mounted on rollers 45, one of which is driven by means (not shown). A water spray 70 is provided to wet the mat in its passage to cause the fibers 8 to felt.

The mat is then carried over heated rollers 47 to eliminate the water from the mat. The mat then passes continuously to a belt 49 mounted on rollers 51 and is subjected, while on the belt, to a spray 52 of colloidal silica. This dispersion may contain about 20-30 percent of colloidal silica in water, and after passing the belt 49 the mat 39 enters an oven 53 to completely dry the mat. The mat as it exits from the oven 53 is somewhat rigid, is sliced into suitable dimensions for handling by a knife 55 mounted above belt 57, which belt is itself supported on rollers 59 driven by suitable means (not shown).

The product of the operation is illustrated in Figure 3, the evaporator plate 61 having pores indicated at 63, and the product is relatively rigid, of high capillarity potential, white in appearance, light in weight, and when used in water does not separate to any degree, nor is the mat or the silica thereof affected by water; the silica is in fact indistinguishable on the surface of the mat or plate.

Referring now to Figure 4 there is indicated at 65 a container having a screen 67 on the bottom thereof, and there may be provided in the container an aqueous material 69 which consists of a blend in water of small diameter and large diameter fibers in the proportion of about 9:1 by weight. Also in the blend there has preferably been mixed colloidal silica and as the dispersion settles, the water drains through the screen 67, and a plate similar to that shown at 61 is formed. This plate upon drying has all the characteristics of the evaporator plate referred to hereinbefore.

Referring again to Figure 2 the proportion of fibers of a diameter above one micron to those below one micron are controlled by regulating the blast temperature and velocity. It will be appreciated that the temperature and velocity will vary with the nature of the filaments and the nature of the glass composition fed to the blast.

The efficiency of the plate 61 resulting from either of the processes described is considered to be due to the inclusion of a minor proportion of the very small diameter fibers, that is below one micron, which materially aid the capillarity characteristics of the plate, the fibers being indistinguishable in the plate. Thus with a proportion of 85 percent of the large diameter fibers, 10 percent of the smaller and about 5 percent by weight of colloidal silica, a 4 inch plate is capable of permitting water to rise from the lower portion to the upper portion in about 1½ minutes; increasing the proportion of smaller fibers decreases the time, while decreasing the proportion of smaller fibers increases the time.

Thus suitable products may have the following proportions by weight:

| Large Diameter Fibers, percent | Small Diameter Fibers, percent | Silica, percent | Total |
|---|---|---|---|
| 90 | 5 | 5 | 100 |
| 85 | 5 | 10 | 100 |
| 80 | 10 | 10 | 100 |
| 80 | 15 | 5 | 100 |

It will be understood that this invention is susceptible to modification in order to adopt it to different usages and conditions and accordingly, it is desired to comprehend such modifications within this invention as may fall within the scope of the appended claims.

I claim:

1. The process of producing an evaporator plate adapted to convey water by capillary action which comprises, blending from about 5% to about 15% by weight of glass fibers of ¼ to ½ micron diameter and of a length of about ¹⁄₁₆ inch with at least about 75% by weight of glass fibers of 2 to 5 microns diameter and of a length in the range of ½ to 1 inch, collecting the fibers in mat form, directing a spray of water against said mat to cause interfelting of the fibers thereof, removing water substantially completely from the mat after wet felting, adding an aqueous suspension of a particulate bonding agent to the dried mat, and drying the product substantially free of water.

2. The process of producing an evaporator plate adapted to convey water by capillary action which comprises, blending together in a gaseous stream 80 to 90% by weight of glass fibers of a diameter of 2 to 5 microns and lengths of ½ to 1 inch with 5 to 15% by weight of glass fibers having diameters of ¼ to ½ micron and lengths of about ¹⁄₁₆ inch, collecting the fibers in mat form, directing a spray of water against said mat to cause interfelting of the fibers thereof, drying the product substantially free of water, adding an aqueous suspension of a bonding agent selected from the group consisting of colloidal silica or colloidal alumina to the dried interfelted mat, and drying the product substantially free of water.

3. An evaporator plate adapted to convey water by capillary action comprising, a blend of at least about 75% by weight of glass fibers having diameters in the range of about 2 to 5 microns with from about 5% to about 15% by weight of glass fibers having diameters of ¼ to ½ micron and lengths less than the first-mentioned fibers, said blended fibers being bonded together at their points of contact into a porous plate-like structure by a particulate bonding agent.

4. An evaporator plate adapted to convey water by capillary action comprising, a uniform blend of 80 to 90% by weight of glass fibers having diameters of 2 to 5 microns and lengths of about ½ to 1 inch with 5 to 15% by weight of glass fibers having diameters of ¼ to ½ micron and lengths of about ⅟₁₆ inch, said blended fibers being bonded together at their points of contact into a porous plate-like structure by a particulate bonding agent.

5. An evaporator plate of high capillary potential comprising by weight between about: 80–90% of glass fibers having a diameter of 2–5 microns and a length of about ½ to 1 inch; 5–15% of glass fibers having a diameter of ¼ to ½ microns and lengths not greater than about ⅟₁₆ inch; and colloidal silica bonding the fibers together, the fibers being blended together to form a substantially uniform plate condition throughout.

6. An evaporator plate of high capillary potential comprising by weight between about: 80–90% of glass fibers having a diameter of 2–5 microns and a length of about ½ to 1 inch; 5–15% of glass fibers having a diameter of ¼ to ½ microns and lengths not greater than about ⅟₁₆ inch; and colloidal alumina bonding the fibers together, the fibers being blended together to form a substantially uniform plate condition throughout.

7. An evaporator plate of high capillary potential comprising by weight 90% of glass fibers having a diameter of 2–5 microns and a length of about ½ to 1 inch; 5% of glass fibers having a diameter of ¼ to ½ microns and lengths not greater than about ⅟₁₆ inch; and 5% colloidal silica bonding the fibers together, the fibers being blended together to form a substantially uniform plate condition throughout.

8. An evaporator plate of high capillary potential comprising by weight 85% of glass fibers having a diameter of 2–5 microns and a length of about ½ to 1 inch; 5% of glass fibers having a diameter of ¼ to ½ microns and lengths not greater than about ⅟₁₆ inch; and 10% colloidal silica bonding the fibers together, the fibers being blended together to form a substantially uniform plate condition throughout.

9. An evaporator plate of high capillary potential comprising by weight 80% of glass fibers having a diameter of 2–5 microns and a length of about ½ to 1 inch; 10% of glass fibers having a diameter of ¼ to ½ microns and lengths not greater than about ⅟₁₆ inch; and 10% colloidal silica bonding the fibers together, the fibers being blended together to form a substantially uniform plate condition throughout.

10. An evaporator plate of high capillary potential comprising by weight 80% of glass fibers having a diameter of 2–5 microns and a length of about ½ to 1 inch; 15% of glass fibers having a diameter of ¼ to ½ microns and lengths not greater than about ⅟₁₆ inch; and 5% colloidal silica bonding the fibers together, the fibers being blended together to form a substantially uniform plate condition throughout.

References Cited in the file of this patent

UNITED STATES PATENTS

| | | |
|---|---|---|
| 2,054,809 | Fleisher | Sept. 22, 1936 |
| 2,057,393 | Powell | Oct. 13, 1936 |
| 2,085,129 | Stoewener | June 29, 1937 |
| 2,331,146 | Slayter | Oct. 5, 1943 |
| 2,527,329 | Powers et al. | Oct. 24, 1950 |
| 2,692,220 | Labino | Oct. 19, 1954 |
| 2,703,486 | Ford | Mar. 8, 1955 |
| 2,721,139 | Arledter | Oct. 18, 1955 |
| 2,751,962 | Drummond | June 26, 1956 |
| 2,762,168 | McCutchen | Sept. 11, 1956 |

OTHER REFERENCES

Ser. No. 305,403, Marocco (A.P.C.), published May 4, 1943.